3,717,706
ATTRACTANTS FOR THE YELLOW JACKET WASP (VESPULA SPP: VESPIDAE)

Terrence P. McGovern, Bowie, and Morton Beroza, Silver Spring, Md., Harry G. Davis, Fresno, Calif., and Gaines W. Eddy, McAllen, Tex., assignors to the United States of America as represented by the Secretary of Agriculture
No Drawing. Filed June 16, 1970, Ser. No. 46,796
Int. Cl. A01n 17/14
U.S. Cl. 424—84          32 Claims

ABSTRACT OF THE DISCLOSURE

A number of saturated esters having a carboxylic acid moiety and an alcohol moiety and containing from 9 to 14 carbon atoms were prepared from $C_1$ through $C_8$ normal carboxylic acids, $C_4$ through $C_6$ branched acids, and $C_2$ through $C_4$ monochlorinated acids and found to be potent and highly specific attractants for the yellow jacket wasp (Vespula spp.). Incorporated into compositions containing an insecticide, chemosterilant, or other control agent, the attractants provide an improved means of reducing or eliminating populations of yellow jackets.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to certain saturated esters of normal, branched-chain, and chlorine-containing acids as attractants for the yellow jacket wasp (Vespula spp.) and more specifically to combinations of these attractants with insect control agents, such as insecticides, chemosterilants, and the like to provide the attractant compositions that are more effective and selective in action than the control agents alone.

Yellow jackets are pests of medical importance that can cause serious injury and even death (American Journal of Medical Science, 36, 129, 1963). The potential usefulness of a specific attractant in the control of this pest is considerable, especially in picnic, camping, or general recreational areas, where the constant harassment of this pest can constitute a serious hazard (Journal of Economic Entomology, 54, 628, 1961). For example, in control efforts the attractant may be used in traps or mixed with a poisonous bait. Current control recommendations call for treatment of nests which are usually difficult to locate. However, the wasp attractants have proved particularly effective in helping to locate the nests. Wide-area application of insecticides for yellow jacket control is thereby avoided, and insecticides are applied only where needed. These attractants have a further advantage in that they offer practically no chemical hazard to man or animals, i.e., only the responding insect contacts the control agent. A unique feature of the lures herein described is that they are highly specific for yellow jackets and do not attract beneficial species such as honey bees.

An object of the present invention is to provide specific, economical attractants for reducing or eliminating populations of yellow jackets.

A further object is to provide chemical yellow jacket attractants suitable for inclusion in compositions with insecticides, chemosterilants, and other insect control agents.

The most potent yellow jacket lures used in past programs were esters that incorporated at least one center of unsaturation in the molecule, 2,4-hexadienyl butyrate being the standard lure (Journal of Medical Entomology, 4, 275, 1967 and Journal of Economic Entomology, 61, 459, 1968). The chemicals of this invention are as much as 2.5 times more attractive than the standard lure.

According to the present invention, saturated organic esters having a carboxylic acid moiety and an aliphatic hydrocarbon alcohol moiety containing from 9 to 14 carbon atoms per molecule, as shown in Table I, prepared from normal, branched-chain, and chlorine-containing carboxylic acids were found to be potent and highly specific attractants for the yellow jacket wasp.

In the preferred embodiment of the invention the alcohol moiety of the organic ester, as shown in Table I, is derived from a saturated aliphatic hydrocarbon alcohol having five to nine carbon atoms, and acid moiety is derived from a saturated normal aliphatic acid having three to six carbon atoms.

In another embodiment of the present invention the acid moiety of the organic ester is derived from a saturated branched-chain aliphatic acid moiety having four to six carbon atoms, especially the isobutyric, isovaleric, and pivalic moieties.

In still another embodiment of the present invention the acid moiety of the organic ester is derived from a saturated, chlorine-substituted, aliphatic acid having two to four carbon atoms, especially the 2-chloropropionic, 3-chlorobutyric, and 4-chlorobutyric radicals.

The attractiveness for yellow jackets of the esters of the present invention was demonstrated by practical field tests. In a typical test about 0.25 ml. of the ester to be evaluated and 2 ml. of acetone were placed in the bottom of a straight-sided, glass pint jar which was rotated to distribute the compound and evaporate the solvent. The opening of the jar was equipped with an inverted screen cone having a ½-inch diameter hole at the apex of the cone. The traps were then placed in the field 1 to 2 feet apart on boards positioned about 3 feet above the ground. In most tests, 5 compounds were tested on a single board with the standard in the center; when only 2 compounds were tested (the standard plus 1 other material), the materials were separated by about 3 feet. Tests were usually started at noon and terminated 24 hours later. Insects responding to the candidate lure entered the orifice and were then unable to escape from the trap. Relative attractiveness (RA) of the materials was determined by dividing the number of wasps captured by the test compound by the number caught by the standard and multiplying the quotient by 100.

Table I gives the relative attractiveness of the esters to the yellow jacket when compared with the standard lure, 2,4-hexadienyl butyrate. Many other esters of branched-chain alcohols (of the acids listed) were tested but are not included in Table I because they were much less effective than the standard. However, many low RA values are given in Table I in order to illustrate how the activity peaks and then diminishes in each homologous series.

Among the compounds listed in Table I, those which follow are known materials, as indicated by the accompanying literature references. The latter are the Handbook of Chemistry and Physics, 50th edition (1969), designated by "H"; Beilstein's Handbuch der Organischen Chemie, 4th edition (published by Edwards Brow, Ann Arbor, Michigan, 1943), designated by "B"; and the Chemical Abstracts, designated by "C.A." Where other sources are named, they are identified in detail:

Octyl propionate: H, p. C–446, compound 1327.

Heptyl butyrate: B, vol. II, p. 272. See also: Davis et al., J. Econ. Ent., vol. 62 (5), p. 1245 (1969); and Hoffmann, Riechstoffe p. Aromen, vol. 9, pp. 273–6 (1959); C.A., 54, 2667c (1960).

Octyl butyrate: H, p. C–216, compound 2681; Agriculture Handbook 239 (June 1963), compound No. 751; Musaev et. al., Sin. Prevrashch Monomernykh Soedin, 1967, pp. 33–35; C.A. 70, 1175g (1969).

Hexyl valerate: H, p. C–411, compound 225; Agriculture Handbook 239 (June 1963), compound No. 2045.

Heptyl valerate: H, p. C–411, compound 225; Agriculture Handbook 239 (June 1963), compound No. 2044.

Octyl valerate: H, p. C–411, compound No. 230; Koslov et al., Tr. Kazansk Khim.-Tekhnol. Inst., No. 30, pp. 101–108 (1962); C. A. 60, 3175a (1964);

1-methylheptyl hexanoate: B., vol. II, p. 323;

Octyl isobutyrate: B., vol. II, 2nd Supplement, page 261; Agriculture Handbook 239 (June 1963), compound No. 1397.

Octyl isovalerate: B., vol. II, p. 312; Agriculture Handbook 239 (June 1963), compound No. 1425.

Nonyl butyrate: Hersek et al., Istanbul Univ. Fen. Fak. Necm., Seri C, vol. 31, p. 43–51 (1966); C. A. 69, 43.37On (1968).

Heptyl isobutyrate: Agriculture Handbook 239 (June 1963), compound No. 1382; Roger et al, Recherches, vol. 1, pp. 79–82 (1937); C.A. 32, 1241[7] (1938).

Monyl isobutyrate: Morel, Soap, Perfumery, and Cosmetics, vol. 25, pp. 512–515 (1952); C.A. 47, 8316 (1953).

Hexyl 2-methylvalerate: Agriculture Handbook 239 (June 1963), compound 2076.

Octyl chloroacetate: Agriculture Handbook 239 (June 1963), compound No. 3660; Denisenko et al., Zh. Obshch. Khim. vol. 32, pp. 731–735 (1962); C.A. 58, 6680f (1962).

Heptyl 3-chlorobutyrate: Schlenk, U.S. Pat. No. 2,830,-040 (April 8, 1958); British Pat. 786,844 (Nov. 27, 1957).

Pentyl 4-chlorobutyrate: Netherlands application No. 6,411,972 (April 15, 1966; applied Oct. 14, 1964); C.A. 65, 16906h (1966). See also, British Pat. No. 1,003,495 (1965); C.A. 64, 3430 (1966).

Hexyl 4-chlorobutyrate: Falbe et al., Chem. Ber., vol. 98, pp. 2312–2316 (1965); C.A. 63, 8398c (1965).

Octyl 4-chlorobutyrate: Falbe et al., supra.

The remaining compounds in Table I were prepared by standard esterification procedures familiar to all skilled in the art.

The foregoing examples of attraction of yellow jacket wasps by chemical lures are meant to be illustrative rather than limiting. For example, mixtures of the present invention with inert or other known yellow jacket lures may be used without departing from the disclosure herein. The use of other formulations of these esters are also not example, it is well known in the art that foods, insecticides, or other control agents may be mixed with the attractive chemicals and dispensed for control or detection purposes.

TABLE I.—RELATIVE ATTRACTIVENESS (RA) TO THE YELLOW JACKET WASP OF SATURATED ESTERS COMPARED WITH THE STANDARD 2,4-HEXADIENYL BUTYRATE DURING 1968 AND 1969
[Std.=100]

| Alcohol moiety of the ester | RA of esters of— | | | | | | | | | | | | | | | | | | |
|---|---|---|---|---|---|---|---|---|---|---|---|---|---|---|---|---|---|---|---|
| | Normal acids | | | | | | | | | Branched acids | | | | | Chlorinated acids | | | | |
| | For-mate | Ace-tate | Pro-pion-ate | Buty-rate | Vale-rate | Hex-ano-ate | Hep-tano-ate | Oct-ano-ate | Non-ano-ate | Dec-ano-ate | Iso-buty-rate | Iso-vale-rate | 2-methyl-buty-rate | Piva-late | 2-methyl-vale-rate | 4-methyl-vale-rate | 2-ethyl-buty-rate | Chloro-ace-tate | 2-chloro-propi-onate | 3-chloro-propi-onate | 3-chloro-robuty-tare | 4-chloro-robuty-rate |
| Methyl | | | | | | | | | | | | | | | | | | | | | | |
| Ethyl | | | | 7 | | | 1 | | | | | | | | | | | | 0 | | | 57 |
| Propyl | | 33 | 2 | 36 | 21 | 40 | 9 | 24 | | 9 | | | | | | | | | 11 | | | 95 |
| Butyl | 17 | 5 | 76 | 79 | 50 | 77 | 17 | 20 | 42 | 66 | 38 | 47 | 14 | 20 | 17 | 34 | 14 | 9 | 44 | 37 | 39 | 179 |
| Pentyl | | 69 | 102 | 190 | 104 | 6 | 44 | 13 | 81 | 2 | 109 | 85 | 81 | | 76 | | 80 | 45 | 72 | 42 | 101 | 179 |
| Hexyl | | 85 | 84 | 212 | 159 | 0 | 37 | 0 | 0 | 3 | 144 | 155 | 119 | 76 | 90 | 35 | 28 | 99 | 173 | | 106 | 150 |
| Heptyl | 81 | | | 197 | 117 | | 13 | | | | 185 | 60 | 126 | 253 | 30 | 36 | | 39 | 168 | 70 | 43 | |
| Octyl | 71 | | 54 | 60 | 70 | | | 5 | | | 64 | | | 210 | | | 37 | 32 | 40 | | | |
| Nonyl | | | | | | | | | | | | | | | | | | 17 | | | | |
| Decyl | | | | | | | | | | | | | | | | | | | | | | |
| Undecyl | 29 | 0 | 40 | 69 | | 102 | | | | | | 18 | | 60 | 7 | 55 | 39 | | | 39 | | |
| 1-methylheptyl | | | | 29 | | 145 | | | | | 96 | | | | | | | | | | | |
| 2,2,4-trimethylpentyl | | | | | | | | | | | | | | | | | | | | | | |

We claim:

1. A method for attracting yellow jacket wasps (Vespula spp.) which comprises exposing said wasps to an effective attractant amount of an ester of a saturated aliphatic hydrocarbon alcohol and an alkanoic acid, said ester having from 9 to 14 carbon atoms.

2. The method of claim 1 wherein the alcohol moiety of the ester is derived from an aliphatic hydrocarbon alcohol having from 5 to 9 carbon atoms and the acid moiety of the ester is derived from a saturated, normal aliphatic acid having from 3 to 6 carbon atoms.

3. The method of claim 2 in which the ester is octyl propionate.

4. The method of claim 2 in which the ester is heptyl butyrate.

5. The method of claim 2 in which the ester is octyl butyrate.

6. The method of claim 2 in which the ester is nonyl butyrate.

7. The method of claim 2 in which the ester is hexyl valerate.

8. The method of claim 2 in which the ester is heptyl valerate.

9. The method of claim 2 in which the ester is octyl valerate.

10. The method of claim 2 in which the ester is 1-methylheptyl hexanoate.

11. The method of claim 1 in which the ester is 2,2,4-trimethylpentyl hexanoate.

12. The method of claim 1 wherein the alcohol moiety of the ester is derived from an aliphatic hydrocarbon alcohol having from 5 to 9 carbon atoms and the acid moiety of the ester is derived from a saturated, branched-chain aliphatic acid having from 4 to 6 carbon atoms.

13. The method of claim 12 in which the ester is heptyl isobutyrate.

14. The method of claim 12 in which the ester is octyl isobutyrate.

15. The method of claim 12 in which the ester is nonyl isobutyrate.

16. The method of claim 12 in which the ester is 2,2,4-trimethylpentyl isobutyrate.

17. The method of claim 12 in which the ester is octyl isovalerate.

18. The method of claim 12 in which the ester is octyl 2-methylbutyrate.

19. The method of claim 12 in which the ester is nonyl 2-methylbutyrate.

20. The method of claim 12 in which the ester is octyl pivalate.

21. The method of claim 12 in which the ester is nonyl pivalate.

22. The method of claim 12 in which the ester is hexyl 2-methylvalerate.

23. The method of claim 1 wherein the alcohol moiety of the ester is derived from an aliphatic hydrocarbon alcohol having from 5 to 9 carbon atoms and the acid moiety of the ester is derived from a saturated, monochlorine-substituted aliphatic acid having from 2 to 4 carbon atoms.

24. The method of claim 23 in which the ester is octyl chloroacetate.

25. The method of claim 23 in which the ester is octyl 2-chloropropionate.

26. The method of claim 23 in which the ester is nonyl 2-chloropropionate.

27. The method of claim 23 in which the ester is hexyl 3-chlorobutyrate.

28. The method of claim 23 in which the ester is heptyl 3-chlorobutyrate.

29. The method of claim 23 in which the ester is pentyl 4-chlorobutyrate.

30. The method of claim 23 in which the ester is hexyl 4-chlorobutyrate.

31. The method of claim 23 in which the ester is heptyl 4-chlorobutyrate.

32. The method of claim 23 in which the ester is octyl 4-chlorobutyrate.

References Cited

UNITED STATES PATENTS 3,485,868  12/1969  Eddy et al. _____ 424—219

OTHER REFERENCES

Davis et al., J. Econ. Ent., vol. 62(5), p. 1245 (1969).
Davis et al., J. Econ. Ent., vol. 61(2), pp. 459–462 (1968).

ALBERT T. MEYERS, Primary Examiner
V. D. TURNER, Assistant Examiner

U.S. Cl. X.R.
424—311